United States Patent
Zaldivar et al.

(10) Patent No.: US 6,195,010 B1
(45) Date of Patent: Feb. 27, 2001

(54) ON-LINE EARLY WARNING DETECTION SYSTEM OF RUNAWAY INITIATION USING CHAOS THEORY TECHNIQUES

(75) Inventors: José Manuel Zaldivar; Fernanda Strozzi, both of Travedona (IT)

(73) Assignee: European Atomic Energy Community (LU)

( * ) Notice: Subject to any disclaimer, the term of this patent is extended or adjusted under 35 U.S.C. 154(b) by 0 days.

(21) Appl. No.: 09/445,103
(22) PCT Filed: May 19, 1998
(86) PCT No.: PCT/EP98/02930
§ 371 Date: Dec. 2, 1999
§ 102(e) Date: Dec. 2, 1999
(87) PCT Pub. No.: WO98/55220
PCT Pub. Date: Dec. 10, 1998

(30) Foreign Application Priority Data

Jun. 2, 1997 (EP) .................................................. 97108772

(51) Int. Cl.⁷ .................................................. G08B 17/00
(52) U.S. Cl. ..................... 340/588; 340/589; 340/591; 340/870.01
(58) Field of Search ..................... 340/588, 584, 340/589, 591, 870.01, 870.05, 870.09, 870.16, 870.17

(56) References Cited

U.S. PATENT DOCUMENTS 3,974,065 * 8/1976 Powell et al. ..................... 208/216
4,236,219 * 11/1980 Killebrew, Jr. et al. ............. 364/501
4,249,908 * 2/1981 Funk .................................. 260/690
5,000,924 3/1991 Cygnarowicz et al. .

FOREIGN PATENT DOCUMENTS 59-193138  11/1984  (JP) .
62-168541   7/1987  (JP) .

* cited by examiner

Primary Examiner—Jeffery A. Hofsass
Assistant Examiner—Daniel Previl
(74) Attorney, Agent, or Firm—Sughrue, Mion, Zinn, Macpeak & Seas, PLLC

(57) ABSTRACT

An online early warning detection system of runaway initiation in a batch chemical reactor. The system includes sensors for measuring the temperature in the reactor and/or jacket in different regions and at different instants and a device for deducing therefrom criteria for dangerous runaway conditions. This is accomplished by defining the area evolution of the system in the reconstructed phase according to the following formula:

$$div[F(t)] = (1/t)\ln\frac{area(P1_{t=\Delta}, P2_{t+\Delta t}, P3_{t+\Delta t})}{area(P1_t, P2_t, P3_t)}$$

where area signifies the area of the parallelogram given by points P1, P2, P3 at the instant t and t+Δt respectively. An alarm is provided when div[F(t)]>0.

3 Claims, 2 Drawing Sheets

ON-LINE EARLY WARNING DETECTION SYSTEM OF RUNAWAY INITIATION USING CHAOS THEORY TECHNIQUES

The maintenance of safe operation conditions in chemical reactors is of paramount importance to avoid personal and installation damages, and environmental pollution. In general, severe accidents due to runaway reactions can be reduced to one single scenario: if, for some reason, the rate of heat generation by chemical reaction exceeds the rate of heat removal of the cooling system, the temperature of the reacting mass will begin to rise. This in turn will cause an increase of the heat generation rate. This positive feedback mechanism results in an auto-acceleration behaviour of the heat generation rate, producing a large amount of heat in a very short time with the possibility of triggering off-side and chain reactions that eventually can lead to explosion and the destruction or inoperability of the plant.

Major safety advancements of a particular chemical process can only be achieved through the long process of research and engineering experience. Nevertheless, despite conventional fall-back mechanisms, switches and multi-layer control circuitry available today, there is always the possibility of undetected runaway events. A safe reactor is therefore not only characterized by the degree of the complexity of its safety measures but also by the rate with which unexpected and unavoidable potentially dangerous situations can be handled. Early warning devices are therefore indispensable, irrespective of the detailed mechanisms of the reaction and of other safety measures.

Safe operation of chemical reactors in which strongly exothermic reactions take place requires the availability of measurement devices able of detecting hazardous states already in the early stages to allow plant operators to adopt the necessary counter-measures to return to safe conditions. The principle bottleneck for an on-line detection system is the criterion which distinguishes between dangerous and non-dangerous situations. Especially for batch reactors, due to the variety of the process, the on-line safety criterion has to be as independent as possible of the actual process carried out in the plant.

The methods for early on-line detection can be divided into two categories depending upon the quantities being used:
Measurable signals.
Non-measurable state variables, process parameters or characteristic quantities.

In the first case, measurable information about the status of the process is used to detect a malfunction. In the second case it is necessary to develop estimation methods and process models to calculate the non-measurable quantities that will be used afterwards in the criteria for the detection system.

Measurable input and output variables can be directly used to monitor changes in the process. The most common method consists in temperature supervision, but detection procedures based on pressure could be more suitable for certain types of reactions in which an undesired decomposition reaction produces a non-condensable gas. A number of other variables: pH, viscosity, thermal conductivity, etc. may also be easily measurable and can be used for some processes. For example, oxidation can be a dangerous secondary reaction; therefore the oxidation-reduction potential (Redox) of the reacting medium is a good measure to detect initiation of these reactions at its earliest stage. However, for practical applications the sensitivity and reliability of the sensor play an important role to determine the choice of the measurement chosen for the detection system, temperature measurement being often preferred.

The most common procedure consists in measuring online the chosen variable and checking it against preselected limit values, i.e. maximum and minimum. This is referred to an absolute value check. If the measured variable exceeds the set limit an alarm signal is produced. Early warning detection systems, with a criterion based on an absolute value check, are easy and cheap to install and can have good predictive capacity, but they are completely dependent on knowledge of the process, i.e. the limits have to be established beforehand, and are unsuitable for detection of unexpected dangers.

The loss of control in an exothermic batch or semibatch process is characterized by thermal and pressure excursions of the reacting mass due to the large amounts of heat released in a very short time. That means that the derivatives of temperature and pressure or derivatives of the rate increase can be used to predict the runaway excursion. The method of supervising the rate of temperature or pressure rise is not as cheap or as simple as temperature or pressure measurement, because amplification and filtering are necessary before reliable derivative can be calculated. Since the "safe" temperature or pressure need not be specified, the independence and selectivity of this method is higher, but depends also on specific knowledge of the system in order to define the limits, that in this case will be the maximum and/or minimum rate increase of the measured variable. The method of monitoring the acceleration suffers from the same drawbacks as the previous method.

A first improvement in this direction was the safety criterion developed by L. Hub, see his article "On-line hazards identification during chemical processes" published in Proc. Loss Prevention and Safety Promotion Proc.Ind. DECHEMA (1978), Frankfurt, pages 265–272. This criterion which has been used industrially considers the state of the reactor as dangerous when both the first derivative of the temperature difference between the reactor and the jacket and the second derivative of the reactor temperature with respect to time are positive as follows:

$$d^2T/dt^2 > 0 \text{ and } d(T-T_e)/dt > 0 \tag{1}$$

The difficulty in using a double differentiation of the measured temperature with respect to time is that noisy parts in the signal are greatly amplified and affect considerably the result of the evaluation, false alarms being the principal problem. Furthermore, in case of an autocatalytic reaction taking place in the reactor, due to the autoacceleration of the rate of reaction, and, hence, the rate of heat generation, this criterion will give always an alarm despite the hazardousness of the process, if no sufficient positive limits are defined for the values of the first and second derivatives.

On the other side, a considerable amount of work has been done in studying the parametric sensitivity of chemical reactors; such studies had in mind the definition of simple criteria that allowed to establish in which regions of the parameters—that characterize the algebraic-differential equations that describe mass and energy balances of these reactors—the operation would be safe. The question that arises at this point is if it is possible from these studies to extract a safety criterion that may be used on-line as early warning detection criterion.

If a mathematical model of the process exists, the state of the reactor can be reconstructed from measurable variables, which will allow predictive calculation of the future status, or at least, evaluation of new criteria based on these non-measurable quantities. That means that highest predictive power and selectivity can be reached and hence better early detection of hazardous states can be obtained.

Firstly, all the known information about the process is put in the form of a mathematical model that normally consists of a set of algebraic and differential equations. This model is solved on-line by numerical procedures in order to obtain the whole state of the batch reactor.

In addition to the available measured variables, the model-based detection system must be supplied with all the control variables, and the initial and operating conditions. The simulated variables must be compared with the measured variables; a non-zero difference will indicate an incorrect calculation in the model that can be due to unknown disturbances, unknown initial conditions, erroneous parameters, etc. Consequently, the model must be corrected from process measurements. The method to correct these deviations is by minimizing the error using estimation techniques; for instance, a state variable observer (deterministic case) or state variable filter (stochastic case) can be used.

Once the whole state of the system is estimated and the error between predicted and observed responses has been minimised by modifying parameters in the model, different criteria can be applied using data estimated.

Unfortunately, due to the small production levels, time constraints and the enormous variety of batch and semibatch processes, the development of reaction rate models for these type of processes sometimes is not economically justified and therefore the application of model-based techniques is not always possible, being reserved to special cases.

The new method as defined in claim 1 opens a new route, in between the simple use of measured variables and the complex model-based state reconstruction techniques, to assess in advance hazardous situations in chemical reactors. This method is based on temperature measurements and hence no model and complex estimation procedures are necessary. On the other hand, the special mathematical treatment on such temperature measurements makes it possible to reconstruct a phase space in which the divergence of the flow is conserved and hence it can be used for early warning detection of runaway initiation.

The invention will now be described more in detail by means of a preferred embodiment and the enclosed drawings.

Figure 1:
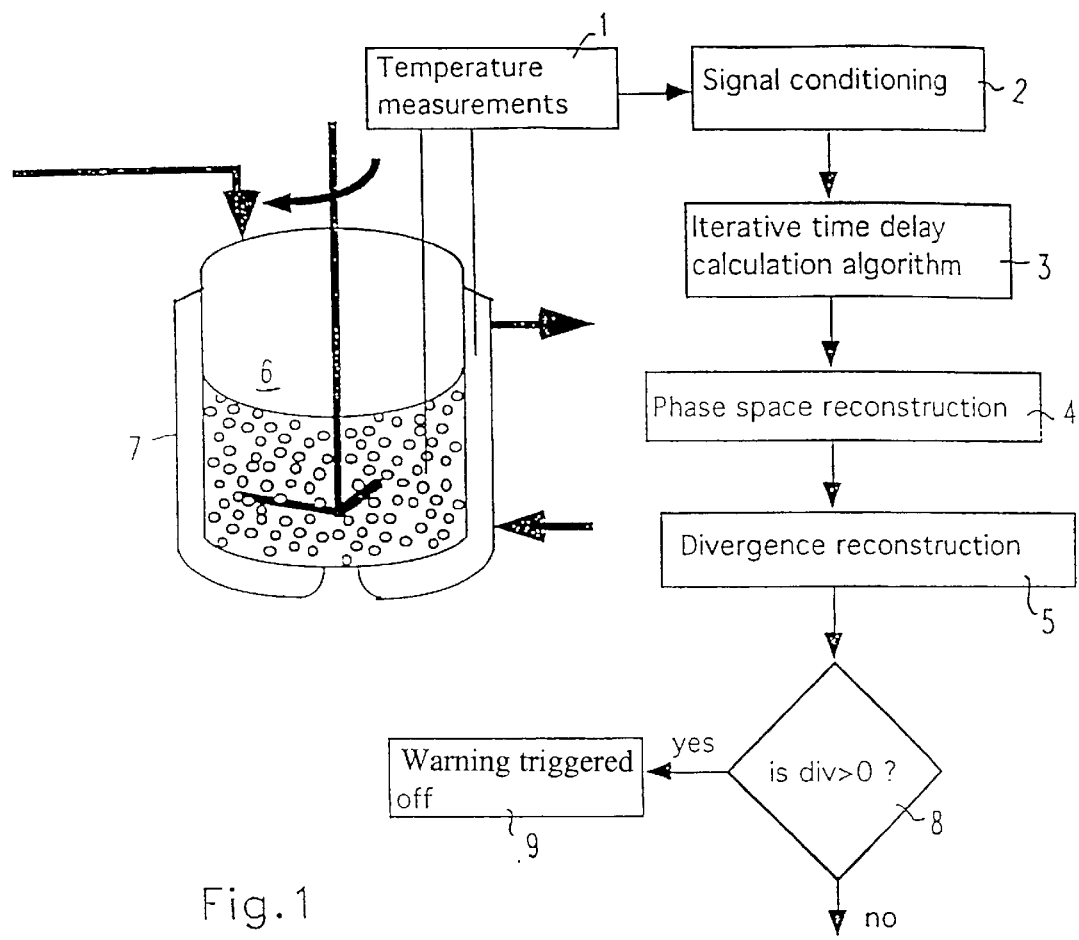
FIG. 1 shows schematically the system according to the invention.

The early warning detection system proposed here is based on non-linear time series analysis using delay coordinate embedding. Phase space reconstruction by time delay embedding, which was introduced by Packard et al, 1980, "Geometry from a time series", Phys.Rev.Lett. 45, pages 712–715, drew ideas from geometry of dynamical systems to provide an alternative technique for early warning detection of runaway events. The basic idea of phase space reconstruction by time delay embedding is that if one has an orbit—or a sequence of points in some multivariable space observed at time differences of sampling times—seen projected onto a single axis, in our case temperature measurements, T(t), then the orbit, which we presume came from an autonomous set of equations, may, by virtue of the projection overlap with itself in the variables T(t). There is not overlap of the orbit with itself in the true set of state variables by the uniqueness theorems about the solution of autonomous equations, but one does not know these true state variables having observed only T(t). If the orbit can be unfolded by providing independent coordinates for a multidimensional space made out of the observations, then the overlaps coming from the projection can be undone and orbits can be recovered which are not ambiguous. The embedding theorem states that if the motion of a dynamical system lies on an euclidean space of dimension $d_A$, then its image through a diffeomorphism in another euclidean space of dimension d, being $d \geq 2d_A+1$, exists and does not overlap. Thus the phase space cannot be reconstructed in its original form. However, one may be able to reconstruct a phase space that is in some sense equivalent to the original, i.e. one in which the invariant properties, such as Lyapunov exponents and differential characteristics, of the dynamics are preserved.

By studying a dissipative chemical reaction carried out in batch or semibatch, the trajectories in state space—temperatures and concentrations—will converge at $t \rightarrow \infty$ to a fixed point when all reagents have been consumed and the final temperature of the reaction mass equals the jacket temperature. In other words, the system of dimension n—reactor temperature and concentrations of different species—collapses to a point, dimension zero. Nevertheless, before reaching the fixed point, the orbits can diverge and hence it is interesting to study the dynamics of such an orbital divergence. For this reason techniques from chaos theory have been modified to study the transient part and not the attractor.

From this basic consideration a system based on a preserved quantity under phase space reconstruction, i.e. the divergence of the system, has been used as early warning detection criterion. To calculate on-line such a quantity, only temperature measurements at different points in the reactor and the jacket are necessary, the data treatment of such temperature measurements allowing to derive this new early warning detection criterion.

In the following, a state space of dimension two (one temperature and one concentration) will be considered, but the same considerations hold for systems of higher dimension, i.e. more complicated kinetic schemes.

The early warning detection device according to the invention can be divided into different modules (see FIG. 1).

a/ Temperature measurement sensors 1: Three different temperatures in the reactor 6 and in the jacket 7 (for the case of isothermal reaction) are measured at different spatial positions. These temperature sensors are placed inside tubes and they should be positioned as far away from each other as possible. The only consideration for the design of such sensors is the requisite that they must be adequately coupled thermally with the media whose temperature is being measured and, consequently, with rapidly changing temperatures the rate of heat transfer between the sensor and process fluid must be sufficient to overcome the thermal capacity of the sensors in order that they can follow the fluctuations in fluid temperature.

Then we will have different temperature time series: $T1=(T1_1, T1_2, \ldots); T2=(T2_1, T2_2, \ldots); T3=(T3_1, T3_2, \ldots);$ for the reactor and equivalently for the jacket.

b/ Signal conditioning module 2: The temperature measurement signals are then filtered using FIR (Finite Impulse Response) filters which do not change the dynamical properties of the signal when applying the phase space reconstruction techniques. This is a standard technique and hence it does not constitute a part of the present invention.

c/ Iterative time delay calculation algorithm 3: Time delay $\tau$ is calculated using an iterative autocorrelation function as temperature measurements are received. The autocorrelation function is defined as:

$$CL(\tau, N) = \frac{\frac{1}{(N-\tau)} \sum_{i=1}^{N-\tau} (T(i) - \overline{T})(T(i+\tau) - \overline{T})}{\overline{T}} \quad (2)$$

T(i) means either T1(i) or T2(i) or T3(i) and $\overline{T}$ means $$\frac{\sum_{i=1}^{N} T(i)}{N} \quad (3)$$

and N is the number of temperature measurements just received. From the first crossing through zero br the first minimum of this function the time delay for the phase space reconstruction is obtained. The election between both criteria depends on which one gives the minimum time.

d/ Phase space reconstruction 4: With this time delay $\tau$ and setting up the embedding dimension to a value of two, the phase space is reconstructed using the three signals (reactor temperatures in the case of isoperibolic reactor, i.e. constant jacket temperature, or temperature differences between the reactor and the jacket in the case of isothermal operation).

This means that time series are reconstructed in a very simple way as follows:
$T1=(T1, T1_2, \ldots, T1_{N-\tau+1}); T2=(T2_1, T2_2, \ldots, T2_{N-\tau+1}); T3=(T3_1, T3_2, \ldots, T3_{N-\tau+1});$
$Z1=(T1_\tau, T1_{\tau+1}, \ldots T1_N); Z2=(T2_\tau, T2_{\tau+1}, \ldots T2_N); Z3=(T3_{96}, T3_{\tau+1}, \ldots T3_N);$
where T and Z refer to the same temperature time series delayed by $\tau$. Hence, in the reconstructed phase space, instead of having temperatures and concentrations, temperatures and their time-delayed values are obtained. Therefore, in this space the points will have the following coordinates:

$$P1_t=(T_t, Z1_t); P2_t=(T2_t, Z2_t); P3_t=(T3_t, Z3_t) \quad (4)$$

In this reconstructed phase space, which is not the real phase space, invariant properties are preserved. Specifically, the divergence is used for the early warning detection criterion.

e/ Divergence reconstruction 5: To better understand the procedure, there will now be described the numerical calculation of the divergence for the system given by:

$$dx/dt=F(x) \quad (5)$$

where $F=(f_1, f_2)$ and $x=(T, Z)$. The divergence of system given by eq. 5 is the trace of its jacobian i.e. the sum of the diagonal elements of the following matrix:

$$J = \begin{bmatrix} \frac{\partial f_1}{\partial T} & \frac{\partial f_1}{\partial Z} \\ \frac{\partial f_2}{\partial T} & \frac{\partial f_2}{\partial Z} \end{bmatrix} \quad (6)$$

The Jacobian gives the evolution law of a set of perturbations near a fiducial point $x_0$, i.e.

$$\delta x_0(t)=J(t)\delta x_0(t). \quad (7)$$

Figure 2:
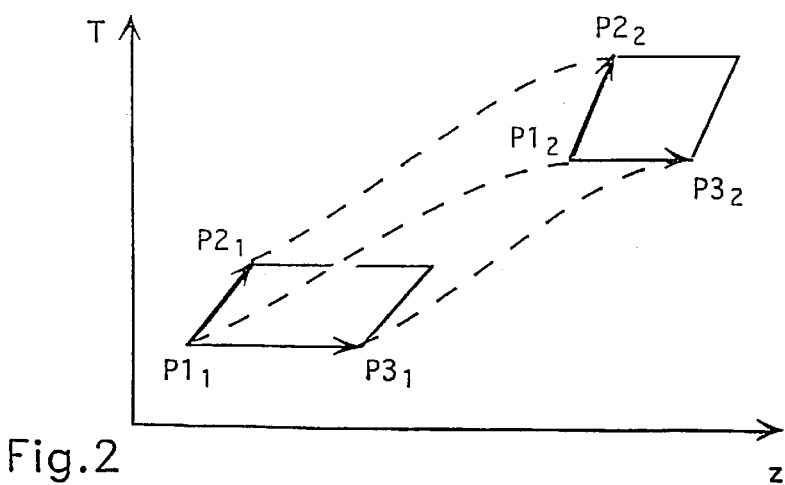
FIG. 2 shows the evolution of three points in the real state space.

The solutions of the system given by eq. 5 multiply the volume of any figure by a factor equal to $\exp(t.tr(J(t)))$. If a region is considered in the state space in which J(t) is constant, the divergence at time t can be calculated as follows (see FIG. 2):

$$div(F(t)) = \frac{1}{t} \ln \frac{Area(P1_{t+\Delta t}, P2_{t+\Delta t}, P3_{t+\Delta t})}{Area(P1_t, P2_t, P3_t)} \quad (8)$$

wherein Area($P1_t, P2_t, P3_t$) is the area of the parallelogram given by the points $P1_t, P2_t, P3_t$. Assuming that the appropriate time delay $\Delta\tau$ has been calculated, and that the embedding dimension has a value of two, to calculate the divergence in the reconstructed space instead of considering:
$P1_t=(T_t, Z1_t); P2_t=(T2_t, Z2_t); P3_t=(T3_t, Z3_t);$
i.e. points with coordinates given by the temperature and the conversion, the points are considered in a new space in which they are defined using only temperature delayed coordinates. In this case, the conversion points are given by:
$Z1=(T1_\tau, T1_{\tau+1}, \ldots T1_N); Z2=(T2_\tau, T2_{\tau+1}, \ldots T2_N); Z3=(T3_{96}, T3_{\tau+1}, \ldots T3_N);$ f/ Alarm when divergence is positive (decision module 8 in FIG. 1): If the divergence becomes positive on a segment of the reaction path, i.e.

$$tr\{J(x(t))\}=div[F(x(t))]>0 \quad (9)$$

an alarm is triggered off, otherwise no action is undertaken (alarm module 9).

Figure 3:
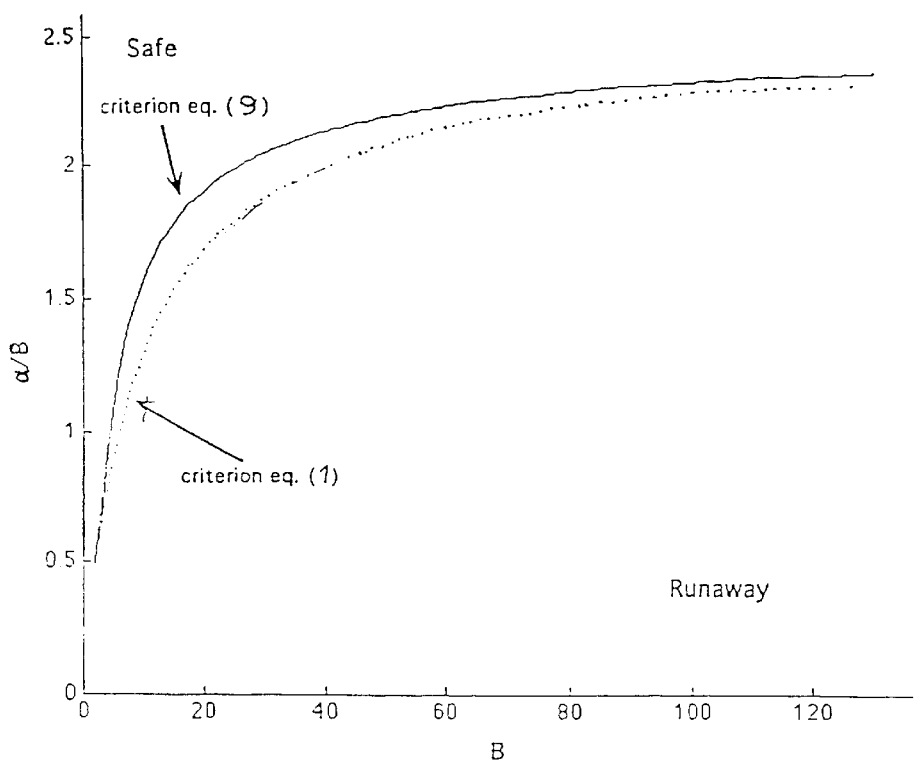
FIGS. 3 and 4 show comparative diagrams of the criteria employed according to the invention and the state of the art.
Figure 4:
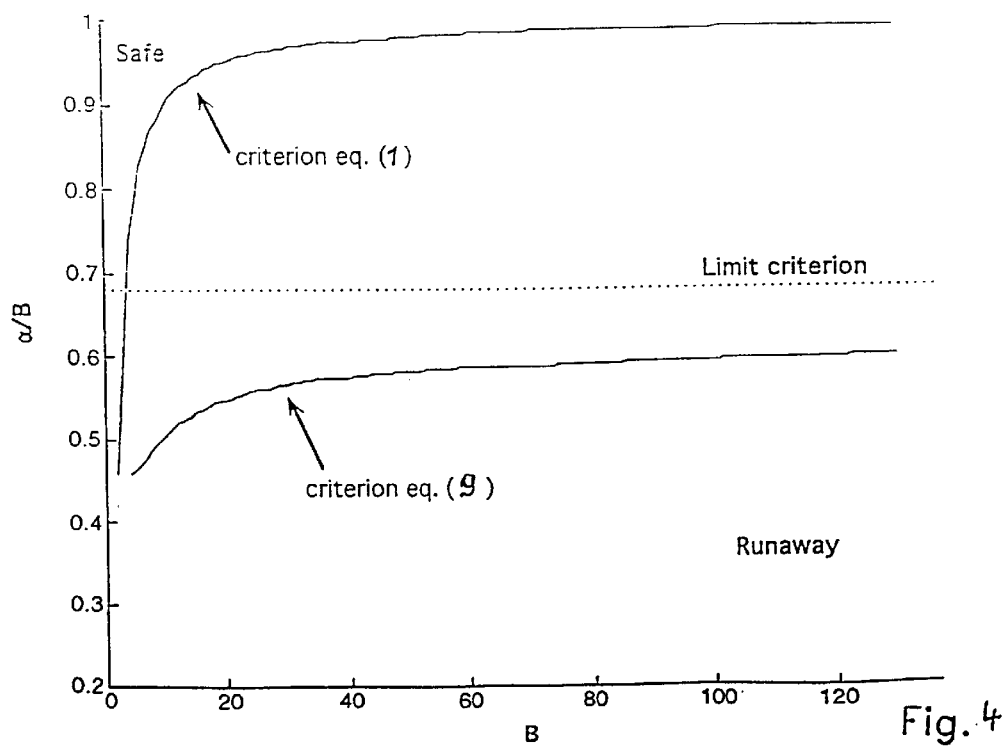

This criterion is now compared with the previously used criteria (eq. 1). FIG. 3 shows the simulated results of the boundary region between safe operation and runaway obtained using the different on-line criteria. As can be seen for low B values (B is the dimensionless adiabatic temperature rise and a is the dimensionless heat transfer coefficient) eq. 9 gives the same results as eq. 1 and is slightly more conservative for higher values of B which means that warning or alarm would occur earlier in the parameter space. FIG. 4 shows the same comparison as FIG. 4 but for an autocatalytic reaction. In this case, for an isoperibolic batch operation, the criterion given by eq. 1 will always give an alarm—if no limits to the first and second derivative are imposed—due to the nature of temperature behaviour during autocatalytic reactions, which is autoaccelerated as conversion increases even though in some cases this effect is negligible.

What is claimed is:

1. An online early warning detection system of runaway initiation in a batch chemical reactor, said system comprising:
    means (12) for measuring the temperature in one of the reactor and its jacket in different regions and at different instants;
    means (3 to 5) for deducing therefrom criteria for dangerous runaway conditions, said deducing means (3 to 5) including means (5) for defining the area evolution of the system in the reconstructed phase space according to the formula $$div[F(t)] = (1/t)\ln\frac{area(P1_{t=\Delta}, P2_{t+\Delta t}, P3_{t+\Delta t})}{area(P1_t, P2_t, P3_t)}$$

wherein area signifies the area of the parallelogram given by points P1, P2, P3 at the instant t and t+Δt respectively; and means (8, 9) for launching an alarm if div[F(t)]>0.

2. An online early warning system according to claim 1, characterized in that the temperature measuring means (1, 2) include finite impulse response filters.

3. An online early warning system according to claim 1 characterized in that time delay Δt is calculated using an iterative autocorrelation function (3) as temperature measurement values are received.

* * * * *